Oct. 16, 1956　　　H. W. WELSH　　　2,766,581
RAM JET ENGINE
Filed June 30, 1950
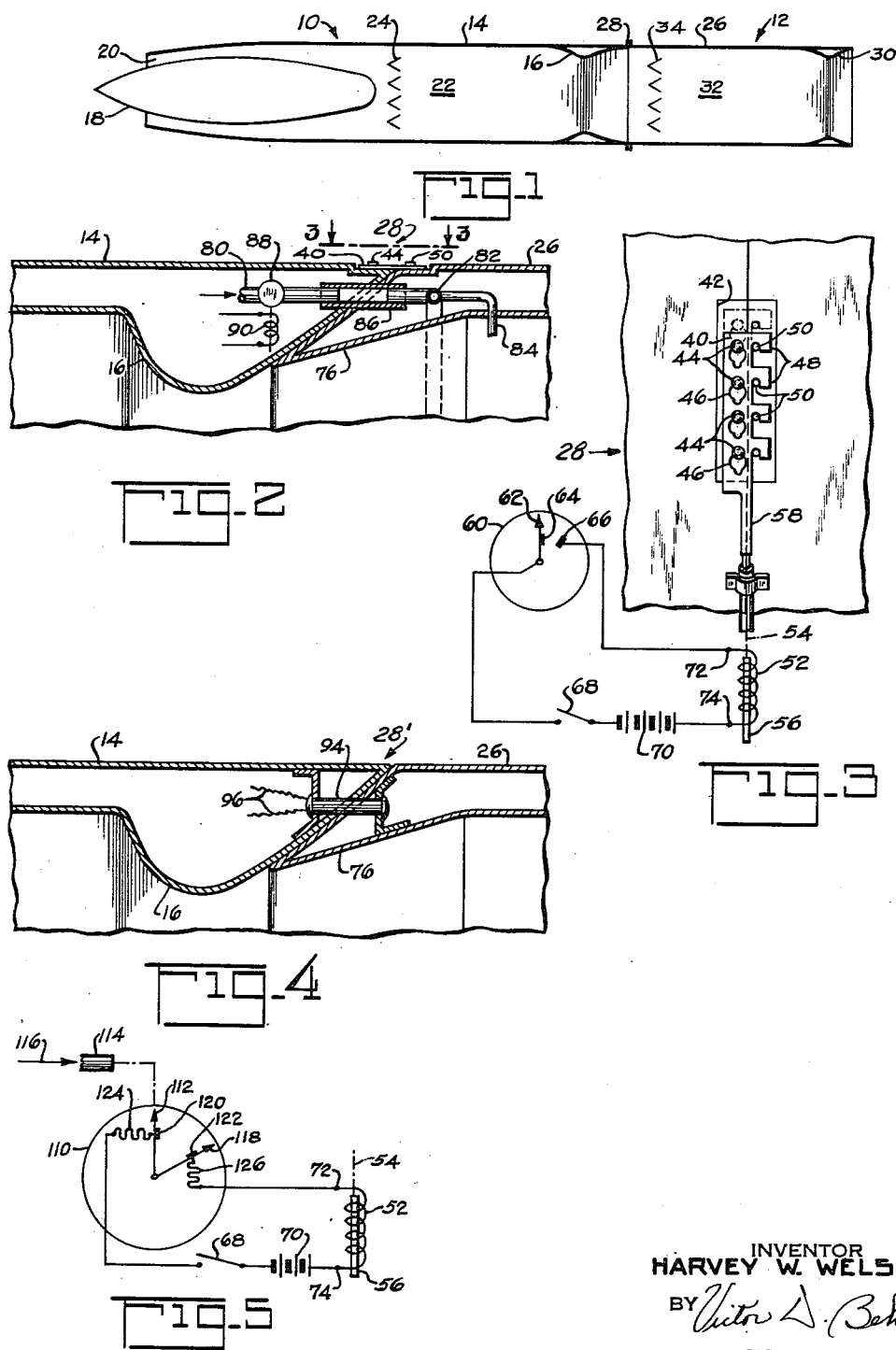
INVENTOR
HARVEY W. WELSH.
BY
ATTORNEY

United States Patent Office 2,766,581
Patented Oct. 16, 1956

2,766,581

RAM JET ENGINE

Harvey W. Welsh, Wyckoff, N. J., assignor to Curtiss-Wright Corporation, a corporation of Delaware Application June 30, 1950, Serial No. 171,267

5 Claims. (Cl. 60—35.6)

This invention relates to ram jet type power plants for aircraft and is particularly directed to such power plants provided with means for varying the discharge nozzle area.

When a ram jet power plant is operated at rich fuel mixtures for maximum thrust at low flight speeds a relatively large nozzle discharge area has been found desirable while a smaller nozzle discharge area has been found desirable when the power plant is operated at relatively lean fuel mixtures for economy and for lower thrust outputs, as during the cruise phase of its flight. In the past, the nozzle discharge area of a ram jet power plant has been made adjustable by means of various valve-like devices, for example by means of a clam-shell-like valve structure or by means of a movable plug co-axially disposed within the nozzle. Such valve-like devices have not proved very satisfactory particularly because of their added weight, which must be carried during the entire flight, and because of the difficulty of providing suitable means for adjustably supporting said devices at the high temperatures encountered at the discharge nozzle of a ram jet power plant.

An object of the present invention comprises the provision of a novel and simple arrangement for changing the effective nozzle discharge area of a ram jet power plant. In accordance with the present invention the duct of a ram jet power plant is made in two co-axial parts, a main part and an expandable part releasably secured to and extending co-axially downstream from said main part. The discharge end of said main part has a discharge nozzle of relatively small fixed area designed for cruising operation and the expendable part has a discharge nozzle of larged fixed area designed for maximum thrust operation.

Other objects of the invention will become apparent upon reading the annexed detailed description in connection with the drawing in which:

Figure 1 is a diagrammatic view of a ram jet power plant embodying the invention;

Figure 2 is an enlarged sectional view illustrating one modification of means for releasably securing the expendable rear section to the main section of the ram jet power plant;

Figure 3 is a view taken along line 3—3 of Figure 2 and, in addition, schematically illustrates means for releasing said expendable section;

Figure 4 is a view similar to Figure 2 but illustrating a modified construction; and Figure 5 is a schematic view illustrating modified means for controlling the release solenoid.

Referring first to Figure 1 of the drawing, a ram jet power plant is illustrated as comprising a main unit 10 and an expendable unit 12, said power plant being designed to provide an aircraft (not shown) with forward propulsive thrust. As used herein, the term aircraft is intended to include missiles.

The main power plant unit 10 comprises a duct member 14 having a discharge nozzle 16 at its rear end and, as illustrated, said nozzle has a convergent-divergent profile. A center body 18 is co-axialy supported at the front or forward end of said duct member 14 thereby providing the power plant with an annular forwardly directed air entrance passage 20. Downstream of the center body 18, the ram jet power plant has a combustion chamber 22 and fuel burner structure to which fuel is arranged to be supplied for combustion with the air entering said chamber through the entrance passage 20. The fuel burner structure for the combustion chamber 22 is schematically illustrated at 24. The fuel pump or pumps and associated mechanism for supplying fuel to the burner structure 24 preferably are housed within the center body 18. The aforedescribed structure of the main unit 10 of the ram jet power plant is similar to that of a complete conventional ram jet power plant.

In accordance with the present invention, the expendable unit 12 includes a duct member 26 co-axially disposed relative to the main duct member 14 of the power plant. The expendable duct member 14 extends downstream from the main duct member and is releasably secured thereto by means schematically indicated at 28. A discharge nozzle 30 is formed at the rear end of said expendable duct member 26. The minimum cross-sectional area of the nozzle 30 is larger than the minimum cross-sectional area of the nozzle 16. In view of this fact the internal diameter of the duct member 26 may be larger than the corresponding diameter of the duct member 14.

The expendable unit duct member 26 also has a combustion chamber 32 to which fuel is adapted to be supplied for combustion therein with the air entering said chamber from the main duct member 14. Fuel burner structure for the combustion chamber 32 is schematically indicated at 34.

For maximum thrust at the relatively low air speeds existing at the initial stages of flight, the ram jet power plant is operated at rich combustion mixtures. Under such circumstances it has been found that a relatively large ram jet discharge nozzle is required. Therefore during the initial aircraft flight stages all or substantially all of the fuel consumed by the ram jet power plant is supplied through the burner structure 34 of the expendable unit 12 for combustion within the combustion chamber 32. During these initial stages of aircraft flight, some fuel may be introduced through the fuel burner structure 24 for combustion within the main combustion chamber 22. This latter fuel combustion should, however, be limited to such an extent that the flow of gases through the main nozzle 16 is of subsonic velocity otherwise the mass gas flow will be limited by the main nozzle 16 rather than by the expendable nozzle 30. In addition, there will also be considerable loss of pressure through said main nozzle 16. It is desirable, however, to burn some fuel in the main combustion chamber 22 during said initial aircraft flight stages because this increases the temperature of the air entering the combustion chamber 32 of the expendable unit 12 thereby reducing the flame holder requirements of the burner structure 34.

When the need for high thrust no longer exists, the expendable unit 12 is released and the aircraft flight continues with just the main unit 10 of the power plant. All the fuel consumed is then supplied through the burner structure 24 for combustion in the main combustion chamber 22. The smaller nozzle 16 of the main unit 10 results in more efficient engine performance for operation at the lean combustion mixtures used during the low thrust or cruising stage of aircraft flight.

Efficient operation of a particular combustion chamber over a wide range of combustion mixture strength (fuel-air ratio) is extremely difficult. Accordingly the aforedescribed power plant structure has a further advantage in that each combustion chamber 22 and 32 need be designed for operation at only one combustion mixture strength. Thus the combustion chamber 32 is designed for operation at a relatively rich combustion mixture and the combustion chamber 22 is designed for operation at relatively lean combustion mixture.

It should be noted that the expendable unit 12 is only used during the initial aircraft flight stages and therefore is only used for a relatively short period of time. Accordingly the expendable unit need not be of rugged and long-life construction.

The present invention is not limited to any particular means 28 for releasably securing the expendable unit 12 to the main unit 10 since obviously many different structures may be used for this purpose. Figures 2 and 3 illustrate a specific form of such structure.

Referring now to Figures 2 and 3, the main duct member 14 is secured to the expendable duct 26 by means of a plurality of circumferentially spaced locking plates 40. Each locking plate 40 bridges the junction between the duct members 14 and 26 and preferably is set in a slight depression 42 in the outer surface of said members so as to form a substantially smooth continuation of said outer surface. Each locking plate 40 is secured to the main duct member 14 by means of a plurality of headed locking pins 44 rigid with and projecting from said duct member through key-hole-like slots 46 in said plate. Each locking plate 40 also has a plurality of hooked formations 48 engaging locking pins 50 rigid with and projecting from the expendable duct member 26. The arrangement is such that each locking plate can be moved a small circumferential distance from its full line position to its dot and dash line position of Figure 3. In the full line position of each plate 40, its hooked formations 48 engage the expendable unit pins 50 for locking the expendable unit 12 to said main unit 10. In the dot and dash line position of each plate 40, the hooked formations 48 are disengaged from the pins 50 whereby the expendable unit 12 is released from the main unit 10.

An electric solenoid 52 and a flexible cable 54 connected to the solenoid plunger 56 may be provided for moving each locking plate 40 to its releasing position. Thus in Figure 3 when the solenoid 52 is energized the flexible cable 54 pushes an arm 58 of the locking plate 40 to move said plate to its dot and dash line position.

The energization of the solenoids 52 may be manually or automatically controlled. In the case of guided missiles launched from the ground, the solenoids are preferably energized automatically when the missile attains a predetermined altitude. Figure 3 illustrates an arrangement for this purpose.

In Figure 3, reference numeral 60 designates any suitable altitude measuring instrument having an arm 62 whose position depends on altitude. An electric contact 64 on the arm 62 is arranged to engage a fixed contact 66 at a predetermined altitude to close a circuit to each solenoid 52. Said circuit includes a master switch 68, which is closed before the missile is launched, and a source of electric energy 70, the solenoids 52 being connected in parallel across the terminals 72 and 74 of said circuit. The altimeter 60 may be supported within the center body 18 or at any other suitable portion of the power plant.

Referring back to Figure 2, the duct members 14 and 26 are illustrated as having a hollow walled construction. In addition the expendable duct member 26 has an annular portion 76 underlying the discharge nozzle 16 of the main duct member 14 thereby insuring accurate coaxial alinement of said members.

Figure 2 also illustrates a fuel supply line 80 for the burner structure 34 of the expendable unit 32. The fuel supply line 80 communicates with a manifold 82 carried by the expendable unit 12 and from which the fuel is distributed to the burner structure 34 through passages such as 84. The supply line 80 also includes a readily rupturable portion 86 extending across the junction of the main and expendable units 10 and 12. Thus the fuel line 80 automatically breaks at the portion 86 when the expendable unit 12 is released. The fuel line 80 may also include a valve 88 which is adapted to be closed upon energization of a solenoid 90 when the expendable unit is released. For this purpose the solenoid 90 may be connected across the circuit terminals 72 and 74 whereby the valve 88 automatically closes the fuel supply line 80 when the expendable unit 12 is released.

Figure 4 illustrates a modified construction for the releasable connection securing the expendable unit 10 to the main unit 12, said modified releasable connection being designated generally by reference numeral 28'. In the releasable connection 28' illustrated in Figure 4, the expendable unit 12 and main unit 10 are secured together by explosive rivets 94. Each rivet 94 contains an explosive charge which is set off when an electric current is passed through the wires 96 leading to said rivet. Thus the rivets 94 of Figure 4 replace the locking plates 40 of Figure 3. The electric ignition circuit for the rivets 94 may be controlled by an altitude measuring instrument such as schematically illustrated at 60 in Figure 3.

Instead of releasing the expendable section at a predetermined altitude, said section may be released when a predetermined flight speed has been attained, said speed preferably being measured in Mach numbers. Mach number is a well known quantity which may be defined as the ratio of velocity through a fluid to the velocity of sound in said fluid. Accordingly a Mach number meter responsive to the flight speed of the power plant 10 may be substituted for the altimeter 60 of Figure 3 for controlling the energization of the release solenoids 52. Such a modification is illustrated in Figure 5.

In Figure 5, the single solenoid 52 illustrated is connected to a Mach number meter 110. As in Figure 3, however, preferably a plurality of solenoids 52 are provided, said solenoids being electrically connected in parallel. Like the meter 60, said Mach number meter may be supported within the center body structure 18. Any suitable Mach number meter may be used. The meter 110 provides an approximate measure of the Mach number of the flight speed which is sufficiently accurate for the purposes of the invention. As illustrated, the meter 110 comprises a rotatable arm 112 which is responsive to changes in the impact pressure of the surrounding air relative to the aircraft, said arm rotating in a clockwise direction in response to an increase in said pressure. For operating the arm 112 a Pitot tube 114, supported by the power plant 10, has its forward end directed into the surrounding airstream relative to the aircraft, said airstream being indicated by the arrow 116. The impact pressure measured by the Pitot tube 113 is transmitted to the meter 110 for operating the arm 112. The Mach number meter 110 also includes a rotatable arm 118 responsive to the static pressure of the surrounding atmosphere, said arm 118 being rotatable in a clockwise direction in response to an increase in said pressure. The arms 112 and 118 carry electric contacts 120 and 122, respectively, said contacts being connected to the circuit of the solenoids 52 by flexible leads 124 and 126, respectively. With this structure the solenoids 52 are energized upon engagement of the contacts 120 and 122. By properly proportioning the relative movements of the arms 112 and 118, within a limited range of static pressures, engagement of the contacts 120 and 122 can be made to occur approximately at a desired predetermined Mach number of the flight speed.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. A jet-type engine for aircraft comprising a main duct-like section having a forwardly-directed air entrance opening at one end, a rearwardly directed convergent-divergent exhaust gas discharge nozzle at its other end, a combustion chamber between and communicating with said ends, and means for supplying fuel into said combustion chamber for continuous combustion therein with the air entering said opening; an expendable duct-like section releasably secured to said main section and extending co-axially rearwardly therefrom, said expendable duct-like section having an exhaust gas discharge nozzle at its rear end, a combustion chamber between and communicating with said nozzles, and means for supplying fuel into said expendable section combustion chamber for continuous combustion therein with oxygen contained in the gases flowing therein from said main section through said main section nozzle, said oxygen coming from air supplied to said main section through said air entrance opening, the minimum cross-sectional area of said expendable section nozzle being larger than the minimum cross-sectional area of said main section nozzle; and means operable to effect release of said expendable section in flight.

2. A jet-type engine for aircraft comprising a main duct-like section having a forwardly directed air entrance opening at one end, a rearwardly directed convergent-divergent exhaust gas discharge nozzle at its other end, a combustion chamber between and communicating with said ends, and means for supplying fuel into said combustion chamber for continuous combustion therein with the air entering said opening; an expendable duct-like section releasably secured to said main section and extending co-axially rearwardly therefrom, said expendable duct-like section having an exhaust gas discharge nozzle at its rear end, a combustion chamber between and communicating with said nozzles, and means for supplying fuel into said expendable section combustion chamber for continuous combustion therein with oxygen contained in the gases flowing therein from said main section through said main section nozzle, said oxygen coming from air supplied to said main section through said air entrance opening, the minimum cross-sectional area of said expendable section nozzle being larger than the minimum cross-sectional area of said main section nozzle; means responsive to the attainment of a predetermined magnitude of a flight condition of said engine; and means controlled by said responsive means for automatically effecting release of said expendable section in flight at said predetermined magnitude of said condition.

3. A jet-type engine for aircraft comprising a main duct-like section having a forwardly directed air entrance opening at one end, a rearwardly directed convergent-divergent exhaust gas discharge nozzle at its other end, a combustion chamber between and communicating with said ends, and means for supplying fuel into said combustion chamber for continuous combustion therein with the air entering said opening; an expendable duct-like section releasably secured to said main section and extending co-axially rearwardly therefrom, said expendable duct-like section having an exhaust gas discharge nozzle at its rear end, a combustion chamber between and communicating with said nozzles, and means for supplying fuel into said expendable section combustion chamber for continuous combustion therein with oxygen contained in the gases flowing therein from said main section through said main section nozzle, said oxygen coming from air supplied to said main section through said air entrance opening, the minimum cross-sectional area of said expendable section nozzle being larger than the minimum cross-sectional area of said main section nozzle; means responsive to the attainment of a predetermined altitude of said engine; and means controlled by said altitude responsive means for automatically effecting release of said expendable section at said predetermined altitude.

4. A jet-type engine for aircraft comprising a main duct-like section having a forwardly directed air entrance opening at one end, a rearwardly directed convergent-divergent exhaust gas discharge nozzle at its other end, a combustion chamber between and communicating with said ends, and means for supplying fuel into said combustion chamber for continuous combustion therein with the air entering said opening; an expendable duct-like section releasably secured to said main section and extending co-axially rearwardly therefrom, said expendable duct-like section having an exhaust gas discharge nozzle at its rear end, a combustion chamber between and communicating with said nozzles, and means for supplying fuel into said expendable section combustion chamber for continuous combustion therein with oxygen contained in the gases flowing therein from said main section through said main section nozzle, said oxygen coming from air supplied to said main section through said air entrance opening, the minimum cross-sectional area of said expendable section nozzle being larger than the minimum cross-sectional area of said main section nozzle; means responsive to the attainment of a predetermined flight speed of said engine; and means controlled by said flight speed responsive means for automatically effecting release of said expendable section at said predetermined flight speed.

5. A jet-type engine for aircraft comprising a first section having a forwardly directed air entrance opening at one end, a rearwardly directed convergent-divergent exhaust gas discharge nozzle at its other end, a combustion chamber between and communicating with said ends, and means for supplying fuel into said combustion chamber for continuous combustion therein with air entering through said opening; and a duct-like second section secured to and extending co-axially rearwardly from the discharge nozzle of said first section so that said duct-like second section is continuous with and forms a rearward continuation of the downstream end of said nozzle whereby said second section is arranged to receive gases discharging through the discharge nozzle of said first section, said second section having an exhaust gas discharge nozzle at its rear end, a combustion chamber between and in communication with said two nozzles, and means for supplying fuel into said second section combustion chamber for continuous combustion therein with oxygen contained in the gases flowing therein from said first section through said first section nozzle, said oxygen coming from air supplied to said first section through said air entrance opening, the minimum cross-sectional area of said first section nozzle being less than the minimum cross-sectional area of said second section nozzle.

References Cited in the file of this patent

UNITED STATES PATENTS

| | | |
|---|---|---|
| 1,102,653 | Goddard | July 7, 1914 |
| 1,901,852 | Stolfa | Mar. 14, 1933 |
| 2,479,776 | Price | Aug. 23, 1949 |
| 2,572,723 | Hildestad | Oct. 23, 1951 |
| 2,641,902 | Kerr | June 16, 1953 |
| 2,644,396 | Billman | July 7, 1953 |
| 2,686,473 | Vogel | Aug. 17, 1954 |

OTHER REFERENCES

Popular Science, March 1947, pages 74, 75.
Popular Mechanics, March 1932, pages 458–463.